(12) United States Patent
Schuck et al.

(10) Patent No.: US 10,459,321 B2
(45) Date of Patent: Oct. 29, 2019

(54) DISTORTION MATCHING POLARIZATION CONVERSION SYSTEMS AND METHODS THEREOF

(71) Applicant: RealD Inc., Beverly Hills, CA (US)

(72) Inventors: Miller H. Schuck, Erie, CO (US); Douglas J. McKnight, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 232 days.

(21) Appl. No.: 15/348,186

(22) Filed: Nov. 10, 2016

(65) Prior Publication Data

US 2017/0131624 A1    May 11, 2017

Related U.S. Application Data

(60) Provisional application No. 62/253,274, filed on Nov. 10, 2015.

(51) Int. Cl.
*G03B 21/14* (2006.01)
*G02B 27/28* (2006.01)
(Continued)

(52) U.S. Cl.
CPC ......... *G03B 21/147* (2013.01); *G02B 27/283* (2013.01); *G02B 27/286* (2013.01);
(Continued)

(58) Field of Classification Search
CPC ...... G02B 7/023; G02B 7/24; G02B 27/0025; G02B 27/22; G02B 27/2221;
(Continued)

(56) References Cited

U.S. PATENT DOCUMENTS 1,128,979 A    2/1915  Hess
1,970,311 A    8/1934  Ives
(Continued)

FOREIGN PATENT DOCUMENTS

CN    1142869 A    2/1997
CN    1377453 A    10/2002
(Continued)

OTHER PUBLICATIONS

JP-200980150139.1 2d Office Action dated Apr. 5, 2015.
(Continued)

*Primary Examiner* — Christina A Riddle
*Assistant Examiner* — Christopher A Lamb, III
(74) *Attorney, Agent, or Firm* — Penny L. Lowry; Neil G. J. Mothew (57) ABSTRACT

Optical systems having at least one polarization beam splitter (PBS) are operable to receive randomly-polarized light bundles from a projector lens. The PBS is further operable to direct light bundles having a state of polarization (SOP) along a light path and operable to direct other light bundles having a different SOP along different light paths. The light paths have optical path lengths which may differ. Each light path produces an image having a distortion which may differ from the distortion of an image produced by a different light path. A compensation in a light path is operable to convert a non-compensated distortion of an image into a compensated distortion that more closely matches the distortion of images in other light paths.

12 Claims, 8 Drawing Sheets

(51) Int. Cl.
  *G02F 1/01*   (2006.01)
  *G03B 21/20*  (2006.01)
(52) U.S. Cl.
  CPC .......... *G02F 1/0136* (2013.01); *G03B 21/142*
    (2013.01); *G03B 21/2073* (2013.01); *G03B
    2205/0092* (2013.01)
(58) Field of Classification Search
  CPC ............ G02B 27/2228; G02B 27/2235; G02B
    27/2242; G02B 27/225; G02B 27/24;
    G02B 27/26; G02B 27/28; G02B 27/281;
    G02B 27/283; G02B 27/09–0994; G03B
    21/142; G03B 21/147; G03B 21/28;
    G03B 21/2073; G03B 2205/00; G03B
    2205/0015; G03B 2205/0023; G03B
    2205/003; G03B 2205/0053; G03B
    2205/0061; G03B 2205/0069; G03B
    2205/0084; G03B 2205/0092; H04N
    9/3185; G02F 1/0136
  See application file for complete search history.

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,355,188 A * | 10/1994 | Biles ............... G03B 21/132 348/E9.027 |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,169,853 B1 * | 1/2001 | Hasushita ............ G02B 15/173 359/557 |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton et al. |
| 8,223,296 B2 | 7/2012 | Lee et al. |
| 8,251,562 B2 | 8/2012 | Kuramitsu et al. |
| 8,325,295 B2 | 12/2012 | Sugita et al. |
| 8,354,806 B2 | 1/2013 | Travis et al. |
| 8,447,190 B2 | 5/2013 | Tanimura et al. |
| 8,477,261 B2 | 7/2013 | Travis et al. |
| 8,502,253 B2 | 8/2013 | Min |
| 8,534,901 B2 | 9/2013 | Panagotacos et al. |
| 8,540,372 B2 | 9/2013 | Coleman et al. |
| 8,556,491 B2 | 10/2013 | Lee |
| 8,651,725 B2 | 2/2014 | Ie et al. |
| 8,714,804 B2 | 5/2014 | Kim et al. |

(56) References Cited

U.S. PATENT DOCUMENTS

| | | |
|---|---|---|
| 8,752,995 B2 | 6/2014 | Park |
| 9,197,884 B2 | 11/2015 | Lee et al. |
| 9,350,980 B2 | 5/2016 | Robinson |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183018 A1 | 8/2007 | Khachaturove et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0225236 A1* | 9/2008 | Schuck ............... G02B 27/26 353/20 |
| 2008/0259012 A1 | 10/2008 | Fergason |
| 2008/0291359 A1 | 11/2008 | Miyashita |
| 2008/0297105 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1 | 4/2010 | Robinson |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0106193 A1 | 5/2012 | Kim et al. |

(56) References Cited

U.S. PATENT DOCUMENTS

| | | | |
|---|---|---|---|
| 2012/0112006 A1* | 5/2012 | Bruce | B05B 12/26 244/129.3 |
| 2012/0127573 A1 | 5/2012 | Robinson et al. | |
| 2012/0154450 A1 | 6/2012 | Aho et al. | |
| 2012/0162966 A1 | 6/2012 | Kim et al. | |
| 2012/0169838 A1 | 7/2012 | Sekine | |
| 2012/0206050 A1 | 8/2012 | Spero | |
| 2012/0236484 A1 | 9/2012 | Miyake | |
| 2012/0243204 A1 | 9/2012 | Robinson | |
| 2012/0243261 A1 | 9/2012 | Yamamoto et al. | |
| 2012/0293721 A1 | 11/2012 | Ueyama | |
| 2012/0299913 A1 | 11/2012 | Robinson et al. | |
| 2012/0314145 A1 | 12/2012 | Robinson | |
| 2013/0101253 A1 | 4/2013 | Popovich et al. | |
| 2013/0107340 A1 | 5/2013 | Wong et al. | |
| 2013/0135588 A1 | 5/2013 | Popovich et al. | |
| 2013/0169701 A1 | 7/2013 | Whitehead et al. | |
| 2013/0169935 A1 | 7/2013 | Schuck et al. | |
| 2013/0294684 A1 | 11/2013 | Lipton et al. | |
| 2013/0307831 A1 | 11/2013 | Robinson et al. | |
| 2013/0307946 A1 | 11/2013 | Robinson et al. | |
| 2013/0321599 A1 | 12/2013 | Harrold et al. | |
| 2013/0328866 A1 | 12/2013 | Woodgate et al. | |
| 2013/0335821 A1 | 12/2013 | Robinson et al. | |
| 2014/0009508 A1 | 1/2014 | Woodgate et al. | |
| 2014/0022619 A1 | 1/2014 | Woodgate et al. | |
| 2014/0036361 A1 | 2/2014 | Woodgate et al. | |
| 2014/0126238 A1 | 5/2014 | Kao et al. | |
| 2014/0240828 A1 | 8/2014 | Robinson et al. | |
| 2014/0253879 A1 | 9/2014 | Schuck et al. | |
| 2014/0340728 A1 | 11/2014 | Taheri | |
| 2014/0368602 A1 | 12/2014 | Woodgate et al. | |
| 2015/0103318 A1* | 4/2015 | Lee | G02B 27/2264 353/8 |
| 2016/0216527 A1* | 7/2016 | Juhola | H04M 1/0264 |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1823292 A | 8/2006 |
| CN | 1826553 A | 8/2006 |
| CN | 1866112 A | 11/2006 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| CN | 1910399 B | 5/2013 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 2003394 A2 | 12/2008 |
| EP | 1394593 B1 | 6/2010 |
| EP | 2451180 A2 | 5/2012 |
| EP | 1634119 B1 | 8/2012 |
| GB | 2405542 | 2/2005 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | 2000048618 A | 2/2000 |
| JP | 2000200049 A | 7/2000 |
| JP | 2001093321 A | 4/2001 |
| JP | 2001281456 | 10/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005116266 | 4/2005 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2006310269 A | 11/2006 |
| JP | 3968742 | 8/2007 |
| JP | H3968742 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 20110216281 | 10/2011 |
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| KR | 20140139730 | 12/2014 |
| TW | 200528780 A | 9/2005 |
| WO | 1994006249 B1 | 4/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |

OTHER PUBLICATIONS

JP-2013540083 Notice of reasons for rejection dated Jun. 30, 2015.
JP-2013540083 Notice of reasons for rejection with translation dated Jun. 21, 2016.
Kalantar, et al. "Backlight Unit With Double Surface Light Emission," J. Soc. Inf. Display, vol. 12, Issue 4, pp. 379-387 (Dec. 2004).
KR-20117010839 1st Office action (translated) dated Aug. 28, 2015.
KR-20117010839 2d Office action (translated) dated Apr. 28, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Marjanovic, M.,"Interlace, Interleave, and Field Dominance," http://www.mir.com/DMG/interl.html, pp. 1-5 (2001).
PCT/DE98/02576 International search report and written opinion of international searching authority dated Mar. 4, 1999 (WO99/11074).
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.

(56) References Cited

OTHER PUBLICATIONS

PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2013.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2017.
PCT/US2016/027350 International search report and written opinion of the international searching authority dated Jul. 25, 2016.
PCT/US2016/034418 International search report and written opinion of the international searching authority dated Sep. 7, 2016.
Robinson et al., U.S. Appl. No. 14/751,878 entitled "Directional privacy display" filed Jun. 26, 2016.
Robinson et al., U.S. Appl. No. 15/097,750, entitled "Wide angle imaging directional backlights" filed Apr. 13, 2016.
Robinson et al., U.S. Appl. No. 15/098,084 entitled "Wide angle imaging directional backlights" filed Apr. 13, 2016.
Robinson, U.S. Appl. No. 13/300,293 entitled "Directional flat illuminators" filed Nov. 18, 2011.
PCT/US2016/061344 International search report and written opinion of international searching authority dated Dec. 22, 2016.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Robinson et al., U.S. Appl. No. 15/165,960 entitled "Wide Angle Imaging Directional Backlights" filed May 26, 2016.
Robinson et al., U.S. Appl. No. 15/290,543 entitled "Wide angle imaging directional backlights" filed Oct. 11, 2016.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026058.7 Chinese 1st Office Action of the State Intellectual Property Office of P.R. China dated Nov. 2, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201480023023.2 Office action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.

(56) References Cited

OTHER PUBLICATIONS

EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13822472.0 European Extended Search Report of European Patent Office dated Mar. 2, 2016.
EP-13843659.7 European Extended Search Report of European Patent Office dated May 10, 2016.
EP-13844510.1 European Extended Search Report of European Patent Office dated May 13, 2016.
EP-13865893.5 European Extended Search Report of European Patent Office dated Oct. 6, 2016.
EP-14754859.8 European Extended Search Report of European Patent Office dated Oct. 14, 2016.
EP-16150248.9 European Extended Search Report of European Patent Office dated Jun. 16, 2016.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
JP-2009538527 Reasons for rejection dated Jul. 17, 2012 with translation.
JP-200980150139.1 1st Office Action dated Feb. 11, 2014.

* cited by examiner

FIG.8B ic # DISTORTION MATCHING POLARIZATION CONVERSION SYSTEMS AND METHODS THEREOF

CROSS-REFERENCE TO RELATED APPLICATIONS

This application claims priority to U.S. Provisional Patent Appl. No. 62/253,274 entitled "Distortion matching polarization conversion systems and method thereof" filed Nov. 10, 2015, which is herein incorporated by reference in its entirety.

TECHNICAL FIELD

This disclosure generally relates to polarization systems, and more particularly to distortion matching in polarization conversion systems.

BACKGROUND

Three-dimensional imagery can be synthesized using polarization control following the projector and also employing polarization controlling eyewear, as generally discussed in U.S. Pat. No. 4,792,850 entitled "Method and system employing a push-pull liquid crystal modulator" filed Nov. 25, 1987, and in U.S. Pat. No. 7,905,602 entitled "Polarization conversion system for stereoscopic projection" filed Sep. 28, 2007, both of which are herein incorporated by reference in their entireties.

Figure 1:
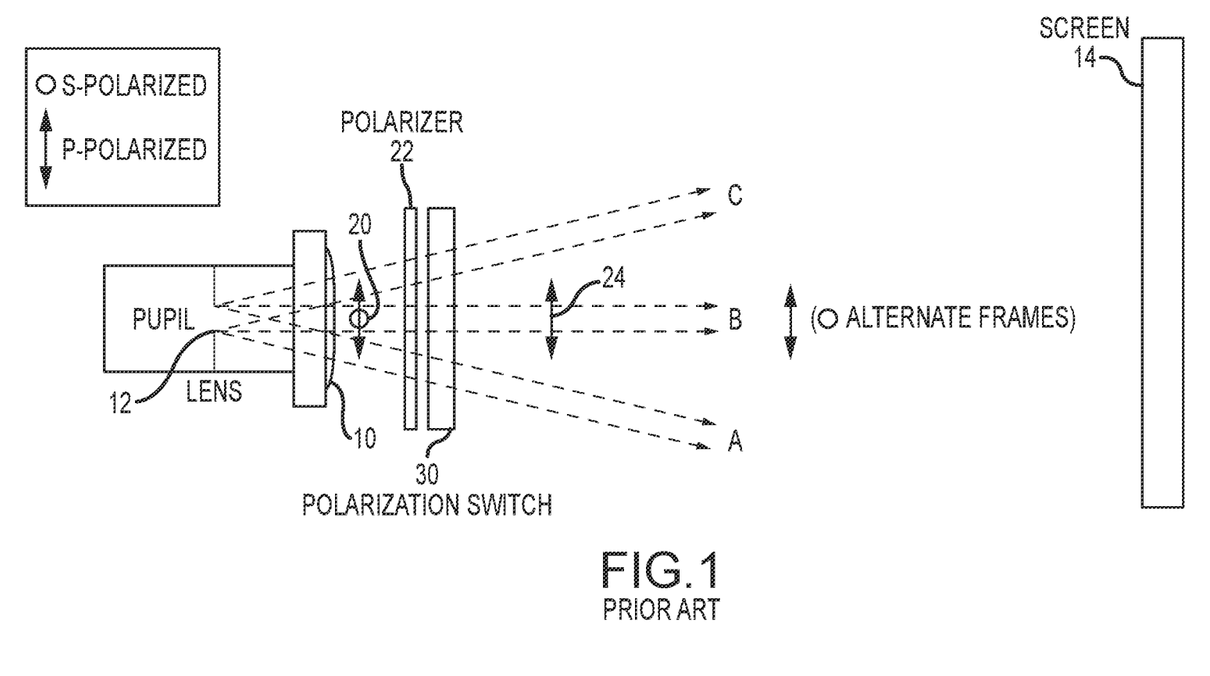
FIG. 1 is a schematic diagram illustrating a polarization conversion system, in accordance with the present disclosure.

A conventional implementation of polarization control at the projector is shown in FIG. 1. In this implementation, nearly parallel rays emerge from the output of the lens 10, appearing to originate from a pupil 12 inside of the lens 10, and converge to form spots on a screen 14. Ray bundles A, B, and C in FIG. 1 are bundles forming spots at the bottom, center, and top of a screen 14, respectively. The light 20 emerging from the projection lens is randomly polarized, depicted in FIG. 1 as both s- and p-polarized light (s-polarized light is conventionally represented as 'o'; p-polarized light is represented with a double arrow-ended line). The light 20 passes through a linear polarizer 22, resulting in a single polarization state after the polarizer 22. The orthogonal polarization state is absorbed (or reflected), and the light flux after the polarizer 22 is typically less than half of the original flux, thus resulting in a dimmer final image. The polarization switch 30 is synchronized with the image frame, and the polarization state 24 emerging from the polarization switch is alternated, producing images of alternately orthogonal polarization at the screen. Polarization-selective eyewear allows images of one polarization to pass to the left eye, and images of the orthogonal polarization to pass to the right eye. By presenting different images to each eye, 3D imagery can be synthesized.

This conventional system has been used in theaters. However, the conventional system requires that greater than 50% of the light is absorbed by the polarizer, and the resulting image is greater than 50% dimmer than that of a typical 2D theater. The dimmer image may limit the size of theater used for 3D applications and/or may provide a less desirable viewing experience for the audience.

BRIEF SUMMARY

According to an aspect of the present disclosure, an optical system may include a polarization conversion system. The polarization conversion system may include at least a polarization beam splitter (PBS) operable to receive randomly-polarized light bundles from a projector lens, and direct first light bundles having a first state of polarization (SOP) along a first light path, and direct second light bundles having a second SOP along a second light path, a polarization rotator located on the first light path, the polarization rotator being operable to translate the first SOP to the second SOP and a polarization switch operable to receive first and second light bundles from the first and second light paths respectively, and to selectively translate the polarization states of the first and second light bundles to one of a first output SOP and a second output SOP. The polarization switch may include first and second polarization switch panels, the first polarization switch panel receiving light from the first light path, and the second polarization switch panel receiving light from the second light path. The polarization conversion system may also include at least one of the following: providing a curved surface on the fold mirror with optical power that compensates for the magnification difference; (2) adding a Fresnel or diffractive surface with optical power to the reflecting element to compensate for the magnification difference; (3) adding a refractive element (lens) between the reflecting element and polarization switch, or between the PBS and reflecting element; or (4) addition of a telephoto lens.

Disclosed herein are optical systems having at least one polarization beam splitter (PBS). The PBS is operable to receive randomly-polarized light bundles from a projector lens. The PBS is further operable to direct light bundles having a state of polarization (SOP) along a light path and operable to direct other light bundles having a different SOP along different light paths. The light paths have optical path lengths which may differ. Each light path produces an image having a distortion which may differ from the distortion of an image produced by a different light path. A compensation in a light path is operable to convert a non-compensated distortion of an image into a compensated distortion that more closely matches the distortion of images in other light paths.

In some embodiments, a compensation may remove distortion from a light path, and in some embodiments, a compensation may add distortion to a light path. In some embodiments, the non-compensated distortion and/or the compensated distortion in a light path may be equivalent to substantially no distortion.

In some embodiments, a compensation may create a vertical tilt in a lens, a half-lens, or a lens pair in a light path. A compensation may be achieved by adjusting a mounting location associated with the optical system, by a mechanical device such as a shim or a hinge, or by some other process or device.

BRIEF DESCRIPTION OF THE DRAWINGS

Embodiments are illustrated by way of example in the accompanying figures, in which like reference numbers indicate similar parts, and in which.

DETAILED DESCRIPTION

According to an aspect of the present disclosure, an optical system may include a polarization conversion system. The polarization conversion system may include at least a polarization beam splitter (PBS) operable to receive randomly-polarized light bundles from a projector lens, and direct first light bundles having a first state of polarization (SOP) along a first light path, and direct second light bundles having a second SOP along a second light path, a polarization rotator located on the first light path, the polarization rotator being operable to translate the first SOP to the second SOP and a polarization switch operable to receive first and second light bundles from the first and second light paths respectively, and to selectively translate the polarization states of the first and second light bundles to one of a first output SOP and a second output SOP. The polarization switch may include first and second polarization switch panels, the first polarization switch panel receiving light from the first light path, and the second polarization switch panel receiving light from the second light path. The polarization conversion system may also include at least one of the following: providing a curved surface on the fold mirror 116 with optical power that compensates for the magnification difference; (2) adding a Fresnel or diffractive surface with optical power to the reflecting element to compensate for the magnification difference; (3) adding a refractive element (lens) between the reflecting element and polarization switch, or between the PBS and reflecting element; or (4) addition of a telephoto lens.

Various embodiments of polarization conversion systems that receive light from a projector are described. The polarization conversion systems present a brighter screen image in cinematic applications utilizing polarized light for three-dimensional viewing.

Polarization-preserving stereoscopic cinema systems have been generally described in several patents and patent applications, for example U.S. Pat. No. 7,905,602 entitled "Polarization conversion system for stereoscopic projection" filed Sep. 28, 2007, U.S. Pat. No. 7,857,455 entitled "Combining P and S rays for bright stereoscopic projection" filed Oct. 18, 2006, U.S. Pat. No. 8,727,536 entitled "Polarization conversion system and method for projecting polarization encoded imagery" filed May 9, 2008, WO 2013/010167 entitled "Optical systems with compact back focal lengths" filed Jul. 16, 2012, and U.S. Pat. No. 8,220,934 entitled "Polarization conversion system for stereoscopic projection" filed Mar. 14, 2011, all of which are herein incorporated by reference in their entireties.

Randomly polarized light from a projector is split into orthogonal polarization states, re-directed and manipulated to produce matching polarization states, and overlaid on-screen for viewing. These systems may actively switch polarization states, for example with liquid-crystal switches or use passive components in dual projector configurations or one projector per eye which may provide greater image brightness.

Three-dimensional (3D) imagery can be synthesized using polarization control following the projector and polarization controlling eyewear (see, e.g., U.S. Pat. No. 4,792,850 to Lipton, which is herein incorporated by reference in its entirety).

A conventional implementation of polarization control at the projector is shown in FIG. 1. In this implementation, nearly parallel rays emerge from the output of the lens 10, appearing to originate from a pupil 12 inside of the lens 10, and converge to form spots on a screen 14. Ray bundles A, B, and C in FIG. 1 are bundles forming spots at the bottom, center, and top of a screen 14, respectively. The light 20 emerging from the projection lens is randomly polarized, depicted in FIG. 1 as both s- and p-polarized light (s-polarized light is conventionally represented as 'o'; p-polarized light is represented with a double arrow-ended line). The light 20 passes through a linear polarizer 22, resulting in a single polarization state after the polarizer 22. The orthogonal polarization state is absorbed (or reflected), and the light flux after the polarizer 22 is typically less than half of the original flux, thus resulting in a dimmer final image. The polarization switch 30 is synchronized with the image frame, and the polarization state 24 emerging from the polarization switch is alternated, producing images of alternately orthogonal polarization at the screen. Polarization-selective eyewear allows images of one polarization to pass to the left eye, and images of the orthogonal polarization to pass to the right eye. By presenting different images to each eye, 3D imagery can be synthesized.

This conventional system has been used in theaters. However, the conventional system requires that greater than 50% of the light is absorbed by the polarizer, and the resulting image is greater than 50% dimmer than that of a typical 2D theater. The dimmer image may limit the size of theater used for 3D applications and/or may provide a less desirable viewing experience for the audience.

Figure 2:
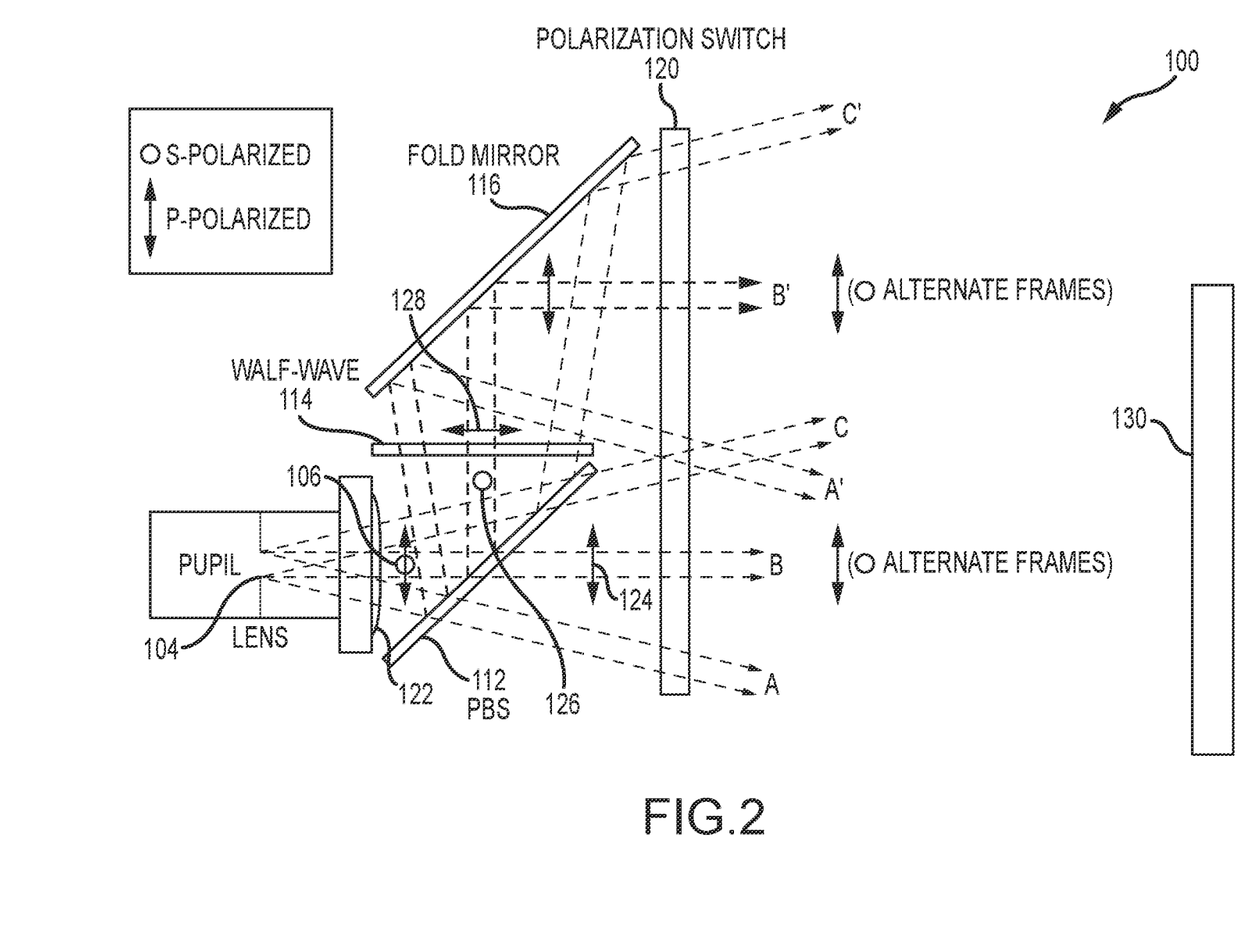
FIG. 2 is a schematic diagram illustrating a polarization conversion system, in accordance with the present disclosure.

FIG. 2 is a schematic diagram showing a polarization conversion system (PCS) 100 for cinematic projection. An embodiment of the polarization conversion system 100 includes a polarizing beam splitter (PBS) 112, a polarization rotator 114, for example a half-wave plate, a reflecting element 116, for example a fold mirror, and a polarization switch 120, arranged as shown. The polarization conversion system 100 may receive images from a conventional projector with a projection lens 122.

In operation, ray bundles A, B, and C emerge randomly polarized from the lens 122 and are projected toward a screen 130 to form an image. In this embodiment, a PBS 112 is inserted in place of the polarizer 22 shown in FIG. 1. The PBS 112 transmits P-polarized light 124, and reflects S-polarized light 126. The P-polarized light 124 passes through the polarization switch (bundles A, B, and C) and is rotated by the polarization switch in alternating frames, same as bundles A, B, and C in FIG. 1.

The S-polarized light 126 reflected by the PBS 112 passes through a polarization rotator 114 (e.g., a half-wave plate, preferably achromatic in some embodiments) and is rotated to p-polarized light 128. The new p-polarized light 128 passes to a fold mirror 116. The fold mirror 116 reflects the new p-polarized light 128 and passes it to polarization switch 120. The polarization switch 120, acting on p-polarized ray bundles A', B', and C', rotates the polarization of the ray bundles in alternating frames, in synchronization with the rotation of bundles A, B, and C. The position of bundles A', B', and C' at the screen may be adjusted (e.g., by adjusting the tilt of the fold mirror 116) to closely or exactly coincide with the positions of bundles A, B, and C at the screen. Since nearly all of the randomly polarized light 106 from the projection lens 122 is imaged at the screen 130 with a single polarization state, the resulting image of the system in FIG. 2 is approximately two times brighter than the image at the screen for the system in FIG. 1.

In this exemplary embodiment, the PBS 112 in FIG. 2 is depicted as a plate. However, various types of PBSs may be used. For example, the PBS plate may be constructed using a wire grid layer on glass (e.g., Proflux polarizer from Moxtek in Orem, Utah), polarization recycling film (e.g., Double Brightness Enhancing Film from 3M in St. Paul, Minn.), polarization recycling film on glass (for flatness), or a multi-dielectric layer on glass. The PBS 112 in FIG. 2 could alternatively be implemented as a glass cube (with wire grid, polarization recycling film, or dielectric layers along the diagonal) to reduce astigmatism in the final image associated with light passing through a tilted plate. Alternatively, the tilted plate PBS 112 in FIG. 2 may, in various embodiments, be implemented with spherical, aspherical, cylindrical or toroidal surfaces to reduce astigmatism in the final image at the screen 130. De-centered spherical, aspherical, cylindrical or toroidal surfaces on the plate, and/or additional de-centered spherical, aspherical, cylindrical or toroidal elements in the optical path after the plate can be implemented to reduce astigmatism in the final image. See, e.g., "Simple method of correcting the aberrations of a beamsplitter in converging light," V. Doherty and D. Shafer, Proc. SPIE, Vol. 0237, pp. 195-200, 1980, which is hereby incorporated by reference in its entirety. It should also be noted that a second flat plate may be inserted into the system after the tilted PBS plate 112 and its tilt adjusted to reduce or correct astigmatism in the final image.

In some embodiments, the polarization rotator 114 in FIG. 2 may be an achromatic half-wave plate. The half-wave plate may be implemented with polymer films (e.g., Achromatic Retardation Plate from ColorLink, Inc., Boulder, Colo.), quartz plates, or a static liquid crystal device optionally patterned to account for geometric polarization alteration. The half-wave plate 114 may be positioned as shown in FIG. 2, or in other embodiments, it may be positioned between the fold mirror 116 and polarization switch 120, intersecting ray bundles A', B', and C'. This implementation may be desirable, as bundles A', B', and C' reflect from the fold mirror 116 in s-polarization state and mirrors often have a higher reflection for s-polarized light. However, with such an implementation, the half-wave plate 114 should be located such that bundles A' and C do not overlap at the plate. Although in most described embodiments herein, the polarization rotator 114 is located in the second light path, it may alternatively be placed in the first light path instead, and the polarization conversion system will operate in a similar manner in accordance with the principles of the present disclosure.

In some embodiments, the fold mirror 116 may be replaced with a PBS element (e.g., wire grid plate). In this case, a purer polarization may be maintained after the PBS element.

Polarization switch 120 may be a switch as taught by U.S. Pat. No. 4,792,850; a switch as taught by any of the switches of commonly-assigned U.S. Pat. No. 7,528,906 entitled "Achromatic Polarization Switches" filed Jun. 14, 2006; hereby incorporated by reference in its entirety, or any other polarization switch known in the art that selectively transforms an incoming state of polarization. In some embodiments, the polarization switch 120 can be split, for example, to increase yield of the device. If the polarization switch 120 is split, it is desirable that the two devices are located such that there is no overlap of bundles A' and C in FIG. 2. Splitting the polarization switch 120 allows one portion to be relocated in the A', B', C' optical path between the half-wave plate 114 and fold mirror 116. Placing the polarization switch 120 here may call for the fold mirror 116 to have better polarization preserving properties (e.g., a Silflex coating from Oerlikon in Golden, Colo.) as this may be the last element in the A', B', C' optical path prior to the screen.

In the polarization conversion system 100 of FIG. 2, the optical path of ray bundle A' is longer than that of ray bundle A (similarly B'-B and C'-C) resulting in a magnification difference between the images produced by A', B', C' and A, B, C. This magnification difference may be unacceptable to an audience, especially for wide angle and short-throw projection systems. Some techniques for correcting this magnification difference may include (1) providing a curved surface on the fold mirror 116 with optical power that compensates for the magnification difference; this solution is achromatic, which is desirable; (2) adding a Fresnel or diffractive surface with optical power to the fold mirror 116 to compensate for the magnification difference (which may or may not be achromatic); (3) adding a refractive element (lens) between the fold mirror 116 and polarization switch 120, or between the PBS 112 and fold mirror 116; a singlet lens is unlikely to be achromatic, but a doublet solution can be achromatic; (4) addition of a telephoto lens as illustrated in FIGS. 3 and 4; or (5) any combination of at least two of the above techniques.

Although as described, p-polarized light is transmitted toward the polarization switch 120, while s-polarized light is directed toward half-wave plate 114, it should be apparent to a person of ordinary skill in the art that an alternative configuration may be employed in which s-polarized light is transmitted toward the polarization switch 120, while p-polarized light is directed toward the half-wave plate 114.

Figure 3:
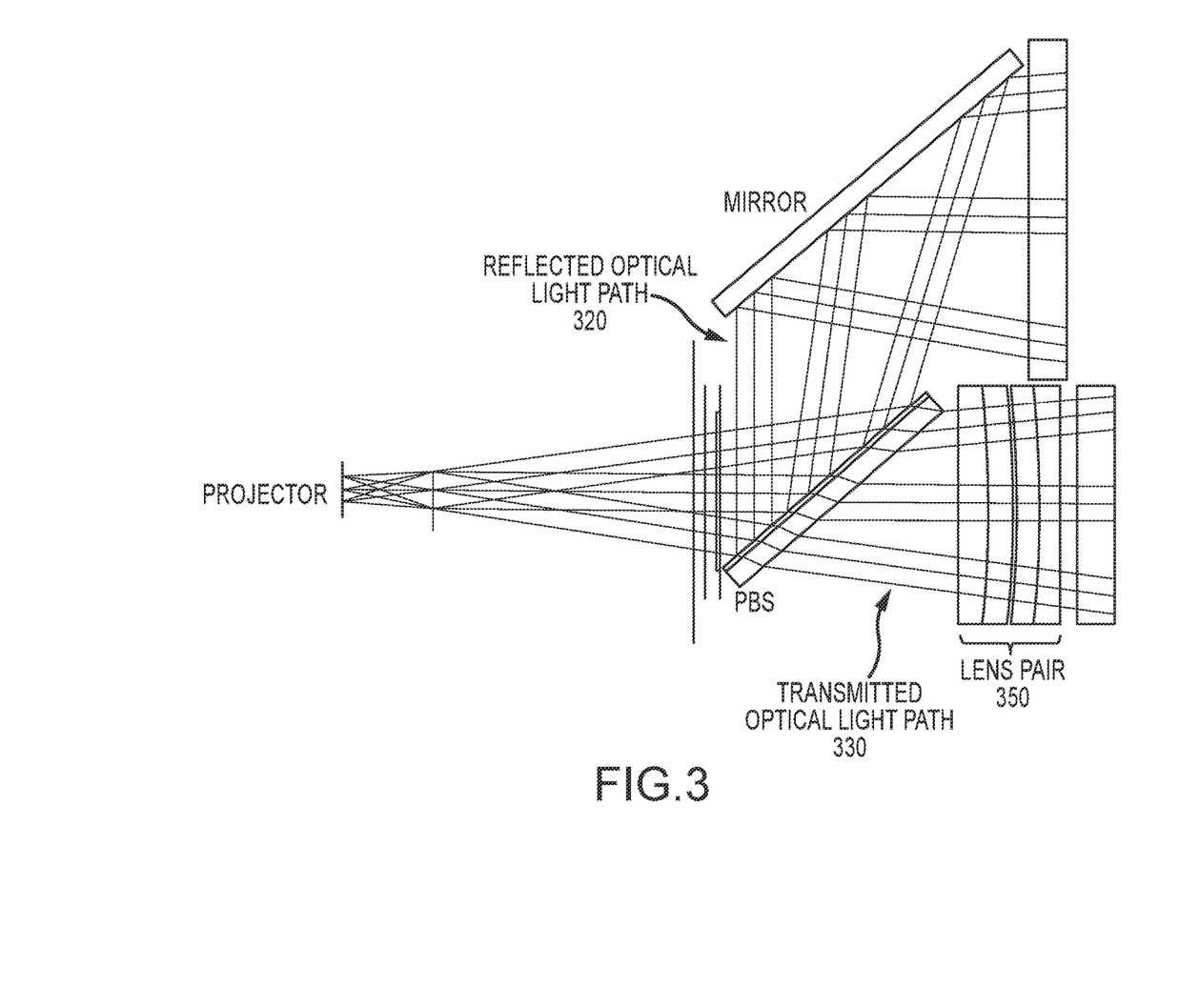
FIG. 3 is a schematic diagram illustrating a polarization conversion system with no lens tilt, in accordance with the present disclosure.

FIG. 3 depicts a polarization conversion system which may be used for creating stereoscopic imagery in digital cinema. The two optical paths (a reflected path 320 and a transmitted path 330) may have different optical path lengths. Without some form of compensation, the two images produced by the two optical paths may not overlay well on-screen. A lens pair 350 may be included in the transmitted path 330, for example, to change the magnification of the transmitted path image to better match the reflected path image.

Figure 4A:
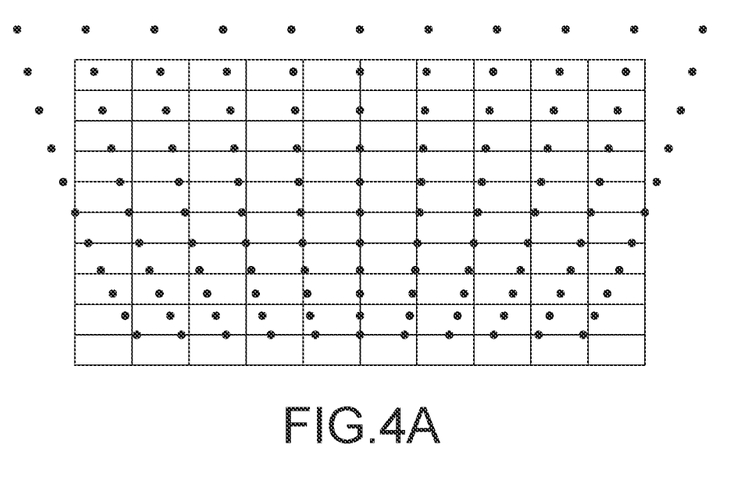
FIG. 4A is a diagram illustrating reflected light path distortion on-screen in a polarization conversion system with no lens tilt, in accordance with the present disclosure.
Figure 4B:
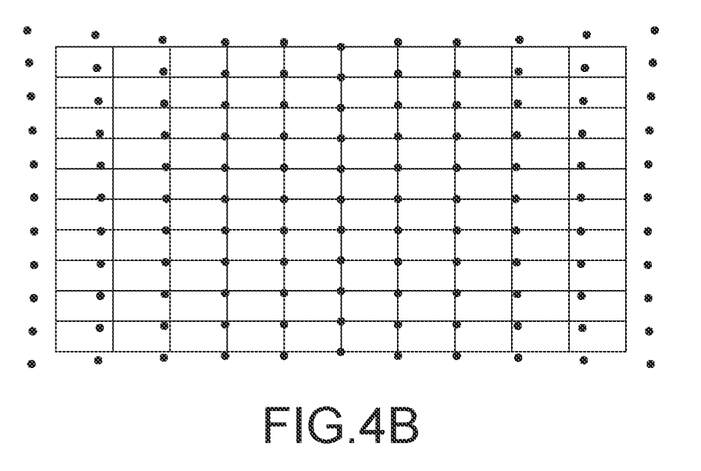
FIG. 4B is a diagram illustrating transmitted light path distortion on-screen in a polarization conversion system with no lens tilt, in accordance with the present disclosure.

For situations when the throw distance (i.e., the distance from projector to screen) is long relative to the distance between reflected and transmitted path optical axes, the image overlay with the art in FIG. 3 is satisfactory. However, for decreasing throw distances, the reflected path image may become more trapezoidal in nature, and overlay of the two images at the corners becomes more difficult. FIG. 4A and FIG. 4B depict the image distortions, magnified 100×, in the two optical paths when the throw distance becomes very short. FIG. 4A shows the trapezoidal distortion of the image in the reflected path 320, whereas FIG. 4B shows the relatively undistorted nature of the image in the transmitted path 330.

Additionally, for situations where the throw ratio decreases, in which the throw ratio may be defined as the ratio of throw distance to screen width, the reflected path image again can be excessively trapezoidal resulting in overlay difficulties.

The mismatch in distortion of the two optical paths can be overcome in short throw and low throw ratio situations by introducing a matching trapezoidal distortion in the transmitted optical path 330 that substantially matches the distortion in the reflected optical path 320. Alternatively, trapezoidal distortion may be removed from the reflected optical path 320 to better match the transmitted path 330. In other words, a compensation may be included in one or both of the light paths to convert the native (non-compensated) distortion into compensated distortions that more closely match.

Figure 5:
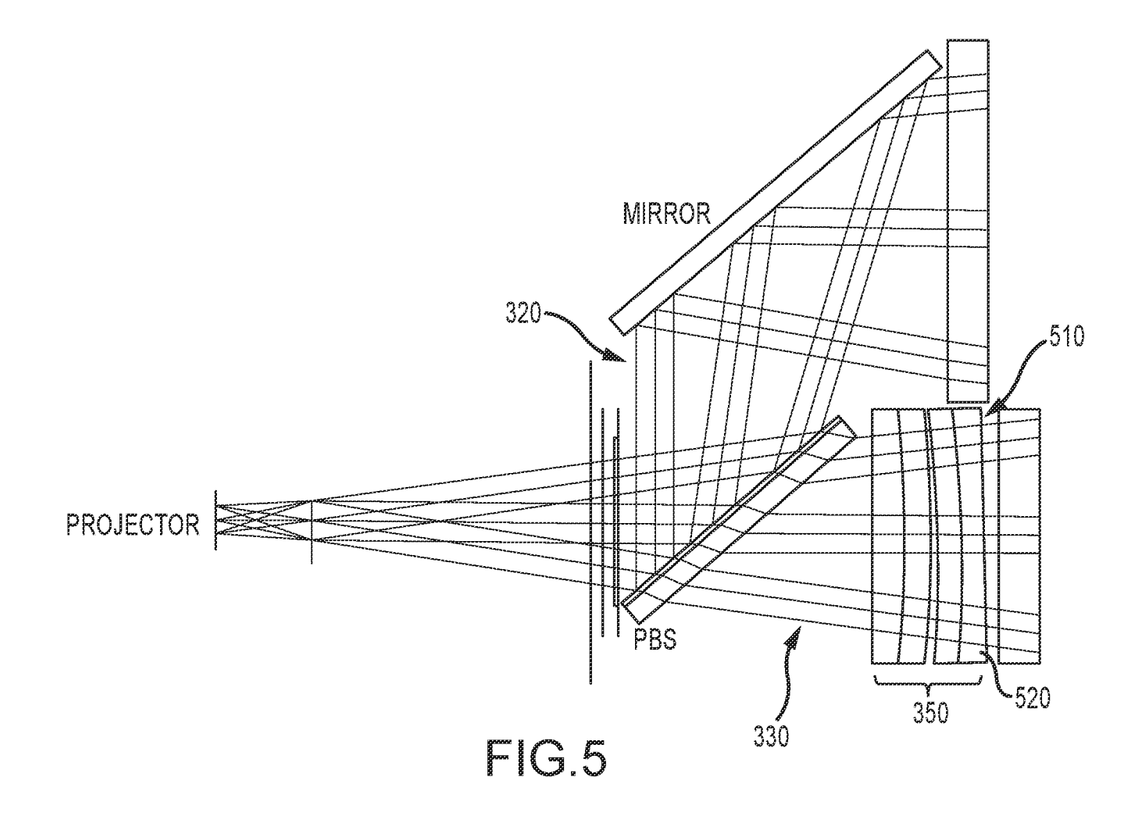
FIG. 5 is a schematic diagram illustrating a polarization conversion system with lens tilt, in accordance with the present disclosure.

Introducing trapezoidal distortion in the transmitted optical path can be accomplished by introducing a tilt in the vertical direction of one or both lenses in the lens pair. In this case, the lens tilt may create varying magnification from top to bottom of the transmitted path image. FIG. 5 is similar to FIG. 3, except that in FIG. 5 a single lens 520 in the lens pair 350 is tilted by approximately 1.5 degrees in the transmitted path 330. The lens may be tilted by a mechanical shim, by a hinge, by an adjustment of mechanical mounting locations, or by any number of mechanical means. For example, a 2.9 millimeter shim may be placed at location 510 to achieve the tilt.

Figure 6A:
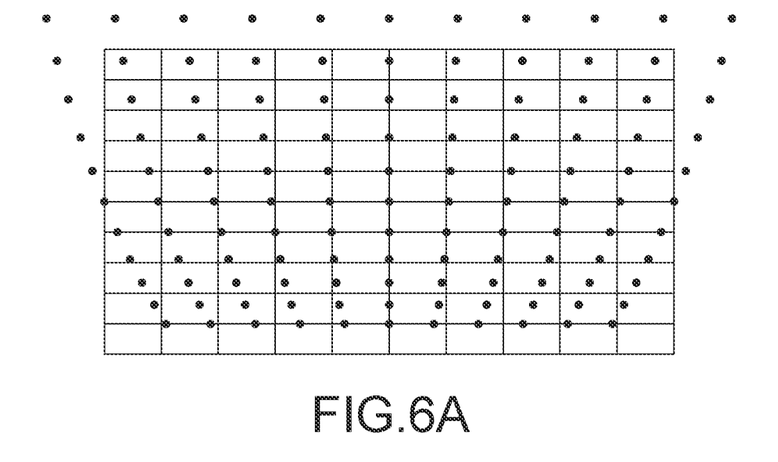
FIG. 6A is a diagram illustrating reflected light path distortion on-screen in a polarization conversion system with lens tilt, in accordance with the present disclosure.
Figure 6B:
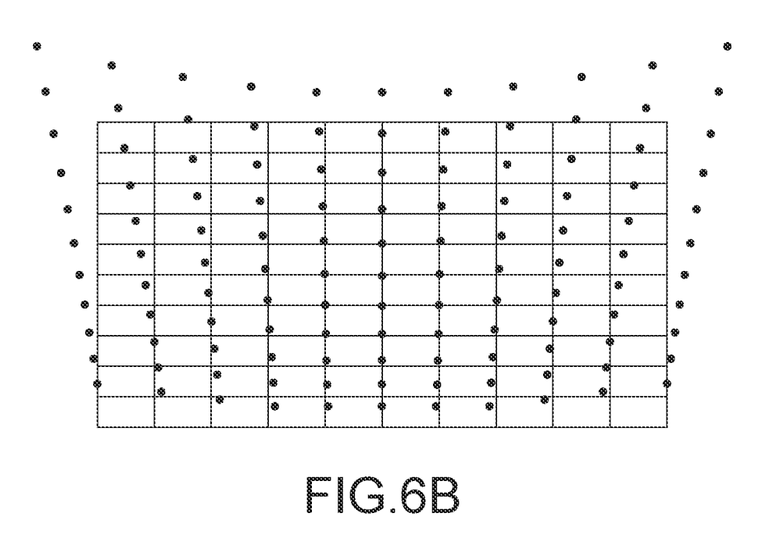
FIG. 6B is a diagram illustrating transmitted light path distortion on-screen in a polarization conversion system with lens tilt, in accordance with the present disclosure.

FIG. 6A and FIG. 6B depict the image distortions, magnified 100×, in the two optical paths when the throw distance becomes very short and a single lens 520 in a lens pair 350 is tilted by approximately 1.5 degrees. FIG. 6A is similar to FIG. 4A and shows the trapezoidal distortion of the image in the reflected path 320, whereas FIG. 6B shows the compensated distortion of the image in the transmitted path 330. The images in the reflected path 320 and the transmitted path 330 are now better overlaid because compensating trapezoidal distortion has been introduced in the transmitted path 330 that is similar to the distortion in the reflected path 320, resulting in significant image overlay improvement in the corners in a short throw environment.

This type of distortion matching can be used with single or multiple projector systems to improve image overlay at the screen.

Figure 7:
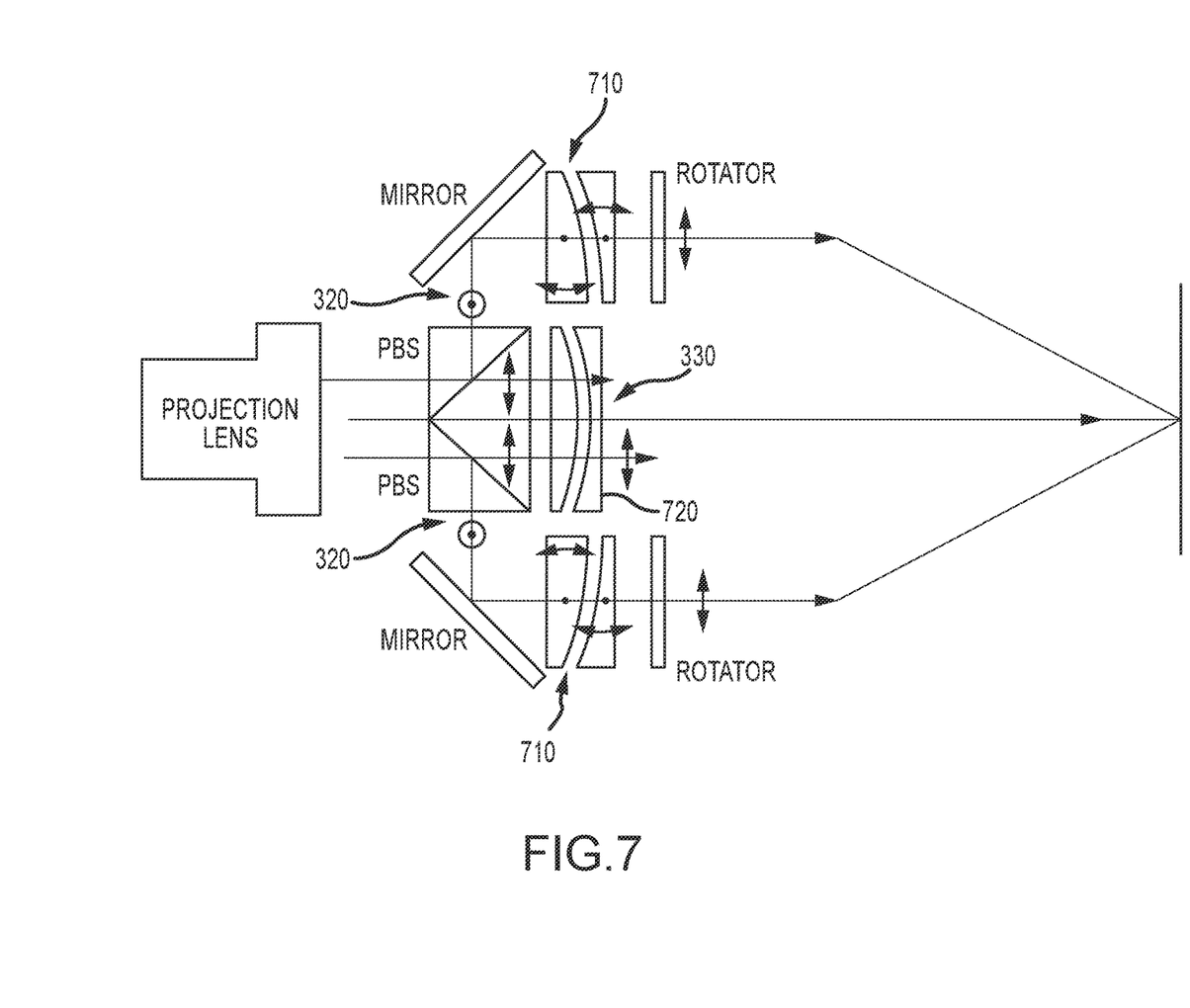
FIG. 7 is a schematic diagram illustrating a stacked polarization system with tilted lens pairs for distortion matching, in accordance with the present disclosure.
Figure 8A:
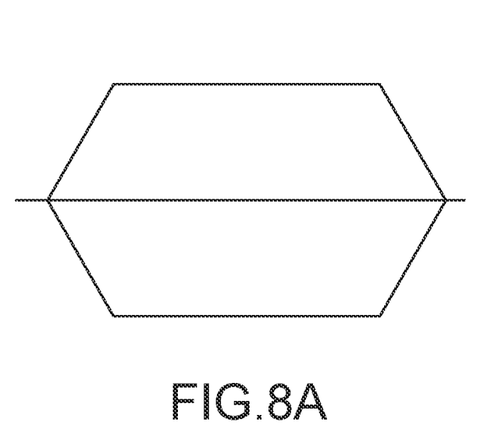
FIG. 8A is a diagram illustrating light path distortion on-screen in a stacked polarization system with no distortion matching, in accordance with the present disclosure.
Figure 8B:
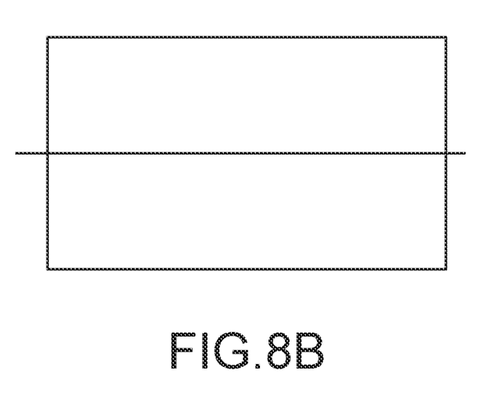
FIG. 8B is a diagram illustrating light path distortion on-screen in a stacked polarization system with tilted lens pairs for distortion matching, in accordance with the present disclosure.

For polarization conversion systems utilizing a stacked configuration, in which two polarization conversion systems are stacked on top of each other to produce overlaid images on-screen, tilted lenses may again be used to improve the image overlay at the screen. FIG. 7 depicts such a system where two lens pairs 710 are included, one for each reflected path 320, to reduce the trapezoidal distortion in each of the reflected paths 320. Additionally depicted is an optional lens pair 720 in the transmitted path 330 for further magnification matching. Note that the lens pairs 710 in the reflected paths 320 may be lens halves, as depicted in FIG. 7, or the lens pairs 710 may be full lenses. FIG. 8A illustrates light path distortion on-screen in a stacked polarization system with no distortion matching, while FIG. 8B illustrates light path distortion on-screen in a stacked polarization system with tilted lens pairs for distortion matching, as depicted in FIG. 7.

As may be used herein, the terms "substantially" and "approximately" provide an industry-accepted tolerance for its corresponding term and/or relativity between items. Such an industry-accepted tolerance ranges from zero to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:
1. An optical system, comprising:
  at least one polarization beam splitter (PBS) operable to receive randomly-polarized light bundles from a projector lens, further operable to direct first light bundles having a first state of polarization (SOP) along a first light path having a first optical path length to produce a first image having a first non-compensated distortion, further operable to direct second light bundles having a second SOP along a second light path having a second optical path length to produce a second image having a second distortion, and further operable to direct third light bundles having the first SOP along a third light path having a third optical path length to produce a third image having a third non-compensated distortion, the first non-compensated distortion and the second distortion having differing amounts of trapezoidal distortion;
  a compensation in the first light path, the compensation operable to convert the first non-compensated distortion into a first compensated distortion, the first com- pensated distortion more closely matching the second distortion than the first non-compensated distortion;
a second compensation in the third light path, the second compensation operable to convert the third non-compensated distortion into a third compensated distortion, the third compensated distortion more closely matching the second distortion than the third non-compensated distortion; and
a first half-lens pair in the first light path and a second half-lens pair in the third light path, wherein the compensation creates a vertical tilt in at least one of the half-lenses in the first half-lens pair, and wherein the second compensation creates a vertical tilt in at least one of the half-lenses in the second half-lens pair.

2. The optical system of claim 1, wherein the first non-compensated distortion is more trapezoidal than the second distortion, and wherein the compensation removes trapezoidal distortion from the first light path.

3. The optical system of claim 1, wherein the first non-compensated distortion is less trapezoidal than the second distortion, and wherein the compensation introduces additional trapezoidal distortion to the first light path.

4. The optical system of claim 1, wherein the compensation is achieved by adjusting a mounting location associated with the optical system.

5. The optical system of claim 1, wherein the compensation is achieved by a mechanical device.

6. The optical system of claim 5, wherein the mechanical device is selected from the group consisting of a shim and a hinge.

7. The optical system of claim 5, wherein the mechanical device is a 2.9 millimeter shim.

8. The optical system of claim 1, wherein the first light path is a transmitted light path, and wherein the second light path is a reflected light path.

9. The optical system of claim 1, wherein the first optical path length is substantially similar to the third optical path length, wherein the first non-compensated distortion is substantially similar to the third non-compensated distortion, and wherein the first compensated distortion is substantially similar to the third compensated distortion.

10. The optical system of claim 1, further comprising:
a polarization rotator located on the first light path, the polarization rotator being operable to translate the first SOP to the second SOP.

11. The optical system of claim 10, further comprising:
a polarization switch operable to receive first and second light bundles from the first and second light paths respectively, and further operable to selectively translate the polarization states of the first and second light bundles to one of a first output SOP and a second output SOP, wherein the polarization switch comprises first and second polarization switch panels, the first polarization switch panel receiving light from the first light path, and the second polarization switch panel receiving light from the second light path.

12. The optical system of claim 1, wherein the first non-compensated distortion is substantially no distortion.

* * * * *